(12) United States Patent
Sasaki

(10) Patent No.: US 8,836,321 B2
(45) Date of Patent: Sep. 16, 2014

(54) MOTOR SPEED DETECTION APPARATUS AND MOTOR CONTROL APPARATUS

(75) Inventor: Masaya Sasaki, Hirosaki (JP)

(73) Assignee: Canon Precision Inc., Hirosaki-shi (JP)

( * ) Notice: Subject to any disclaimer, the term of this patent is extended or adjusted under 35 U.S.C. 154(b) by 239 days.

(21) Appl. No.: 13/551,462

(22) Filed: Jul. 17, 2012

(65) Prior Publication Data

US 2013/0020977 A1 Jan. 24, 2013

(30) Foreign Application Priority Data

Jul. 22, 2011 (JP) ................................. 2011-160670

(51) Int. Cl.
*G01P 3/56* (2006.01)
*G01P 3/489* (2006.01)
*G01P 3/487* (2006.01)

(52) U.S. Cl.
CPC ................. *G01P 3/487* (2013.01); *G01P 3/489* (2013.01)
USPC ............ 324/166; 324/174; 324/163; 318/607

(58) Field of Classification Search
USPC .................. 324/166, 174, 160, 163; 318/799
See application file for complete search history.

(56) References Cited

U.S. PATENT DOCUMENTS

| 4,410,853 | A | * | 10/1983 | Ikoma | ........................... 324/167 |
| 5,166,583 | A | * | 11/1992 | Min et al. | ................. 318/400.06 |
| 5,617,266 | A | * | 4/1997 | Kaniwa et al. | .................. 360/70 |
| 5,796,231 | A | * | 8/1998 | Kyodo | ........................... 318/608 |
| 2004/0140724 | A1 | * | 7/2004 | Higuchi | ................... 310/156.06 |
| 2010/0052585 | A1 | * | 3/2010 | Bonvin et al. | ............ 318/400.17 |

FOREIGN PATENT DOCUMENTS

JP 08-009670 A 1/1996

* cited by examiner

*Primary Examiner* — Eduardo Colon Santana
*Assistant Examiner* — Bickey Dhakal
(74) *Attorney, Agent, or Firm* — Canon U.S.A., Inc., IP Division

(57) ABSTRACT

The motor speed detection apparatus detects rotational speed of a motor. The apparatus includes an FG coil (21) and a magnet (22) to be relatively moved with rotation of the motor, the FG coil outputting an alternating-current signal to be sampled by the apparatus, an A/D converter (1) to convert the alternating-current signal into a digital signal, an integrator (2) to perform time integration on the digital signal, a first determiner (3, 9) to determine which one of plural threshold ranges includes an integration value obtained by the integrator, a second determiner (3, 8) to determine whether change of the integration value is increase or decrease, and a logical product calculator (3, 10) to produce a binary signal showing a logical product of determination results of the first and second determiners. The apparatus calculates the rotational speed based on a production cycle of the binary signal.

3 Claims, 5 Drawing Sheets

MOTOR SPEED DETECTION APPARATUS AND MOTOR CONTROL APPARATUS

BACKGROUND OF THE INVENTION

1. Field of the Invention

The present invention relates to a motor speed detection apparatus that detects rotational speed of a motor by using output from a frequency generation coil.

2. Description of the Related Art

A method of performing feedback control of rotational speed (rotational frequency) of a brushless motor has been proposed which measures the rotational speed using a frequency generation coil (hereinafter referred to as "an FG coil"). Specifically, this method provides the FG coil and a magnet that are relatively moved with rotation of the motor, and samples an alternating-current signal output from the FG coil to detect (calculate) the rotational speed of the motor.

Such a feedback control method can feed back change in rotational speed of the motor more accurately as a sampling frequency for the output of the FG coil (hereinafter referred to as "FG coil output") is set to be higher, which enables good feedback control of the motor.

Japanese Patent Laid-Open No. 08-009670 discloses, as a method of raising the sampling frequency for the FG coil output, a method multiplying (doubling) the FG coil output. This method detects zero crossings of the FG coil output and causes a one-shot mono/multi-vibrator, at each detection of the zero crossing, to produce two pulse outputs for each cycle of the FG coil, thereby providing a raised sampling frequency doubled with respect to an original frequency of the FG coil output. Moreover, Japanese Patent Laid-Open No. 08-009670 discloses, as a method of further raising the sampling frequency, a method differentiating the original FG coil output so as to shift its phase to produce a new FG coil output and doubling the original and new FG coil outputs to combine them, thereby a sampling frequency four times as high as the original frequency of the FG coil output.

However, even the method disclosed in Japanese Patent Laid-Open No. 08-009670 cannot provide a sampling frequency higher than four times of the original frequency of the FG coil output. Providing such a higher sampling frequency requires raising of the original frequency of the FG coil output itself, but it is difficult to raise the original frequency of the FG coil output because of physical restriction in the FG coil and magnet.

SUMMARY OF THE INVENTION

The present invention provides a motor speed detection apparatus capable of arbitrarily setting the sampling frequency of the FG coil output without being subjected to the physical restriction, and provides a motor control apparatus using the motor speed detection apparatus.

The present invention provides as an aspect thereof a motor speed detection apparatus configured to detect rotational speed of a motor. The apparatus includes a frequency generation coil and a magnet that are configured to be relatively moved with rotation of the motor, the frequency generation coil outputting an alternating-current signal to be sampled by the apparatus, an A/D converter configured to convert the alternating-current signal output from the frequency generation coil into a digital signal, an integrator configured to perform time integration on the digital signal output from the A/D convertor, a first determiner configured to determine which one of plural threshold ranges includes an integration value obtained by the integrator, a second determiner configured to determine whether change of the integration value is increase or decrease, and a logical product calculator configured to produce a binary signal showing a logical product of determination results of the first and second determiners. The apparatus is configured to calculate the rotational speed based on a production cycle of the binary signal.

The present invention provides as another aspect thereof a motor control apparatus including the above-described motor speed detection apparatus, and a controller configured to control the motor based on the rotational speed detected by the motor speed detection apparatus.

Other aspects of the present invention will become apparent from the following description and the attached drawings.

DESCRIPTION OF THE PREFERRED EMBODIMENT

Exemplary embodiments of the present invention will hereinafter be described with reference to the accompanying drawings.

Figure 1:
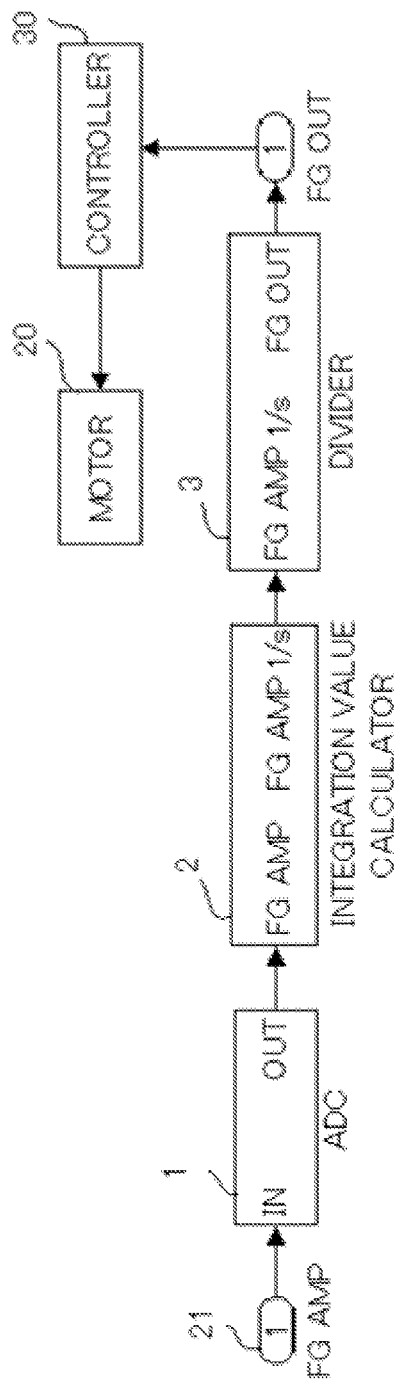
FIG. 1 is a block diagram showing a configuration of a motor control apparatus including a motor speed detection apparatus that is an embodiment of the present invention.

FIG. 1 shows a configuration of a motor control apparatus including a motor speed detection apparatus that is an embodiment of the present invention. In FIG. 1, reference numeral 21 denotes a frequency generation coil (hereinafter referred to as "an FG coil").

Figure 8:
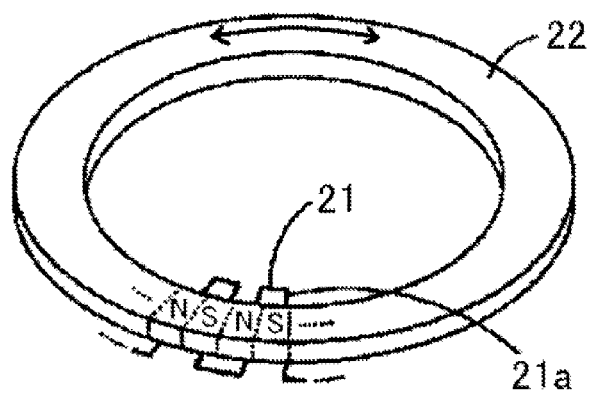
FIG. 8 shows the FG coil and a magnet included in the motor speed detection apparatus.

FIG. 8 shows the FG coil 21 and an FG magnet 22. The FG coil 21 is constituted by plural power generation elements 21a connected with each other in series through connecting wires. The FG magnet 22 is a ring-shaped magnet in which N-poles and S-poles are alternately arranged. The FG magnet 22 is disposed so as to face the FG coil 21. The FG magnet 22 is coupled with an output shaft (not shown) of a motor 20 shown in FIG. 1. Thus, rotation of the motor 20 rotates the FG magnet 22 with respect to the FG coil 21. That is, the FG coil 21 and the FG magnet 22 are relatively moved with the rotation of the motor 20.

The rotation of the FG magnet 22 generates an alternating voltage (alternating-current signal) in each of the power generation elements 21a. Since an arrangement pitch of the power generation elements 21a is identical to a magnetization pitch of the FG magnet 22, the alternating voltages generated in the respective power generation elements 21a have a same phase, and therefore these alternating voltages are added to one another over the circumferentially entire FG coil 21 to be output as an output voltage.

The output voltage of the FG coil 21 is input to an ADC (A/D converter) 1 shown in FIG. 1 to be detected at each cycle of a predetermined AD sampling frequency (for example, 10 MHz) and is converted into a digital signal. The digital signal from the ADC 1 is input to an integration value calculator (serving as an integrator) that performs time integration on the digital signal, and thereby an integration value whose lower limit is 0 and upper limit is 1 is produced.

The integration value from the integration value calculator 2 is input to a divider 3 serving as a first determiner, a second determiner and a logical production calculator. The divider 3 determines "which one of plural threshold ranges includes the integration value" and "whether change of the integration value is increase or decrease", and then produces a High/Low binary signal (square wave signal) showing a logical product of results of these determinations. This embodiment sets "the plural threshold ranges", and provides a sampling frequency (AD sampling frequency) ten times as high as an original frequency of the output of the FG coil 21. Then, a controller 30 calculates rotational speed of the motor 20 based on a production cycle of the binary signal output from the divider 3 to perform feedback control on the motor 20 based on the calculated rotational speed.

Figure 2:
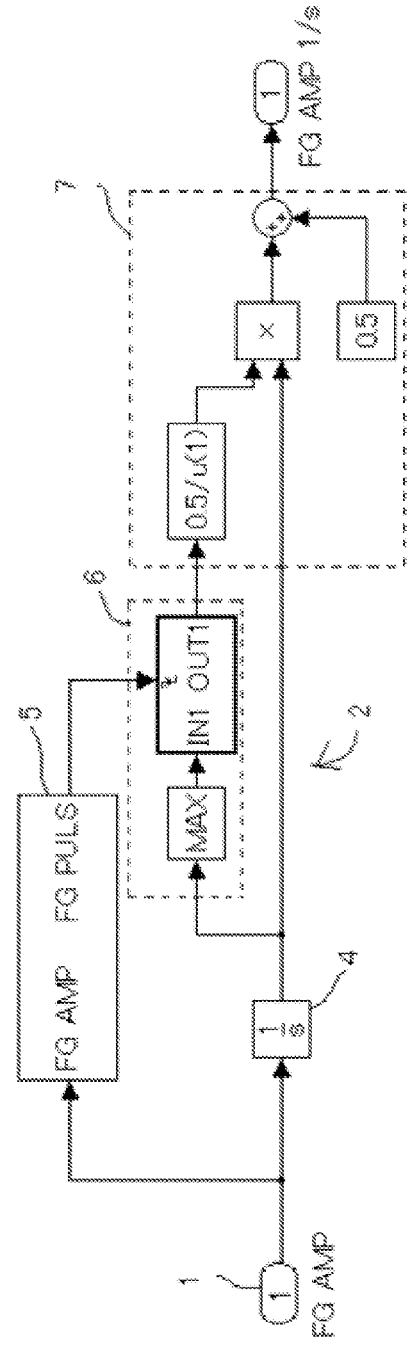
FIG. 2 is a block diagram showing a configuration of an integration value calculator included in the motor speed detection apparatus of the embodiment.

FIG. 2 shows a configuration of the integration value calculator 2 shown in FIG. 1. The digital signal converted from the output voltage from the FG coil 21 by the ADC 1 as described above is input to an integrator 4. The digital signal is hereinafter simply referred to as "an FG coil output". The integrator 4 performs the time integration on the FG coil output to output a resultant integration value. Moreover, the FG coil output is input, through a separate line from that for the integrator 4, to a square-wave converting system 5 that converts the FG coil output into a square-wave signal.

Then, the outputs of the integrator 4 and the square-wave converting system 5 are input to a peak holder 6 that outputs a maximum value of the integration values of the FG coil output integrated at each cycle. Moreover, the outputs of the integrator 4 and the peak holder 6 are input to a gain offset adjuster 7 that produces and outputs an integration value whose lower limit is 0 and upper limit is 1.

This embodiment performs, in order to reduce electrical noise included in a signal showing the integration value obtained by the above-mentioned time integration, peak hold and noise correction at each cycle of the alternating-current signal output from the FG coil 21.

Figure 3:
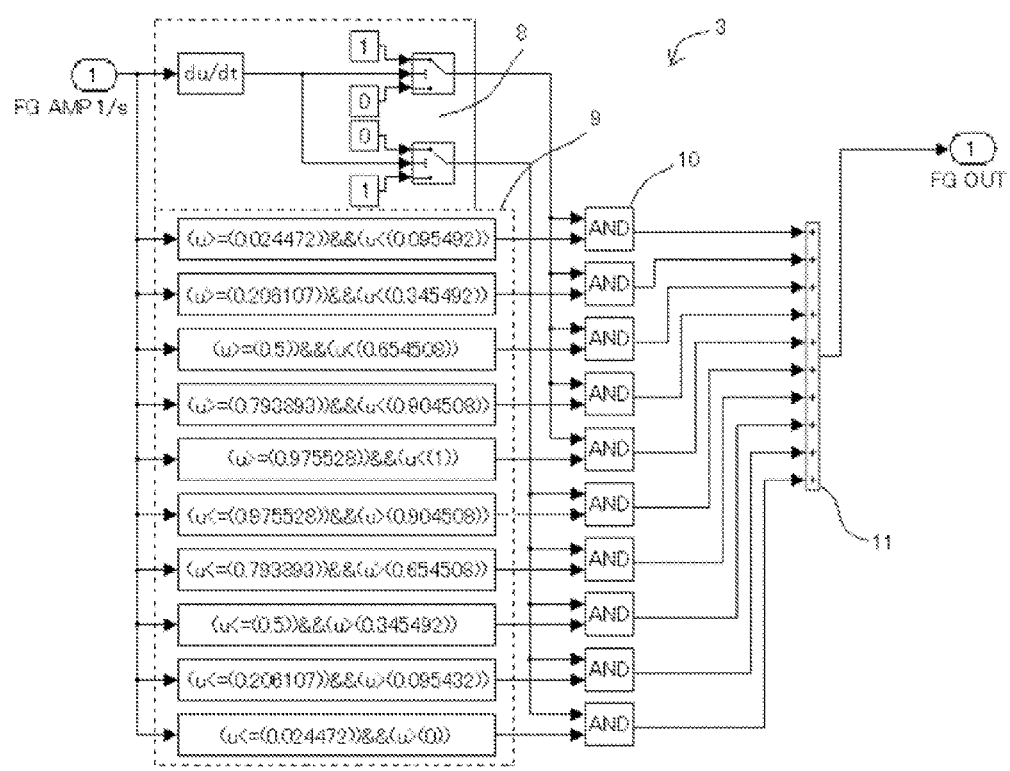
FIG. 3 is a block diagram showing a configuration of a divider included in the motor speed detection apparatus of the embodiment.

FIG. 3 shows a configuration of the divider 3 shown in FIG. 1. The integration value output from the integration value calculator 2 is input to a change amount calculator 8 serving as the second determiner. The change amount calculator 8 determines, as mentioned above, whether the change of the integration value is increase or decrease, and then produces a High/Low binary signal corresponding to the result of the determination. Specifically, the change amount calculator 8 outputs from its upper part in FIG. 3 the High signal when the change of the integration value is increase, and outputs from its lower part in FIG. 3 the Low signal when the change of the integration value is decrease.

The integration value output from the integration value calculator 2 is also input to a threshold determiner 9 serving as the first determiner through a separate line from that for the change amount calculator 8. The threshold determiner 9 determines whether or not the integration value is included in a predetermined threshold range, and then produces a High/Low binary signal corresponding to a result of the determination. Specifically, the threshold determiner 9 outputs the High signal when the integration value is included in the predetermined threshold range and outputs the Low signal when the integration value is not included in the predetermined threshold range. This embodiment provides ten threshold ranges as the above-mentioned plural threshold ranges different from one another. The threshold determiner 9 determines whether or not the integration value is included in each of the ten threshold ranges to produce a High/Low binary signal corresponding to the determination result for each threshold range.

The binary signal corresponding to the result of the determination made by the change amount calculator 8 and the binary signal corresponding to the result of the determination for each threshold range made by the threshold determiner 9 are input to logical calculators 10 provided for the respective threshold ranges. Each of the logical calculators 10 outputs a High/Low binary signal showing a logical product (AND) of the binary signal from the change amount calculator and the binary signal from threshold determiner 9 corresponding to that logical calculator 10. Then, the binary signals from the respective logical calculators are input to an adder 11. The adder 11 adds the binary signals from all the logical calculators 10 to produce the above-mentioned High/Low binary signal that is a resultant added binary signal and is to be output from the divider 3. Then, the adder 11 (divider 3) outputs the produced High/Low binary signal as a speed detection signal to be conclusively used for speed detection.

The controller 30 detects (calculates) the rotational speed of the motor 20 based on the production cycle, that is, a pulse cycle of the speed detection signal (binary signal).

Figure 4:
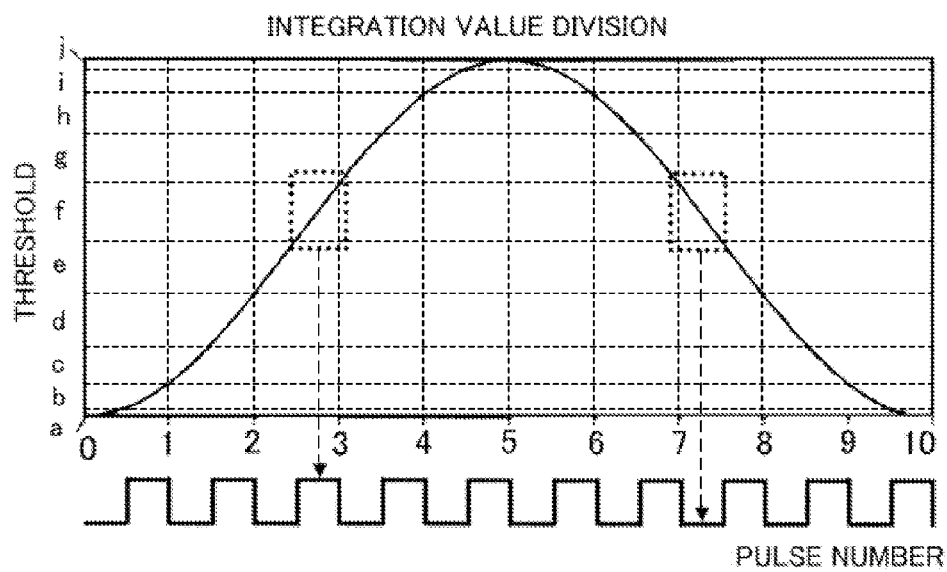
FIG. 4 shows integration value division performed by the divider.

FIG. 4 graphically shows the process performed by the divider 3; a vertical axis shows the integration value and the ten threshold ranges a to j, a horizontal axis shows time, and the speed detection signal (pulse signal) as the binary signal is shown below the graph.

For example, when focusing on the threshold range f, since the change of the integration value at a third pulse portion of the speed detection signal is "increase", the output from the change amount calculator 8 becomes "High". Furthermore, when the integration value is included in the threshold range f, the output from the part of the threshold determiner 9 which determines whether or not the integration value is included in the threshold range f also becomes "High". In this case, the logical calculator 10 outputs "High", and therefore the speed detection signal output from the adder 11 also becomes "High".

On the other hand, since the change of the integration value at an eighth pulse portion of the speed detection signal is "decrease", the output from the change amount calculator 8 becomes "Low". Furthermore, when the integration value is included in the threshold range f, the output from the part of the threshold determiner 9 which determines whether or not the integration value is included in the threshold range f becomes "High". In this case, the logical calculator 10 outputs "Low", and therefore the speed detection signal output from the adder 11 becomes "Low". The speed detection signal is thus produced.

Next, description will be made of a reason to use the integration value of the FG coil output for producing the speed detection signal in this embodiment. The FG coil output (here, the signal before the A/D conversion by the ADC 1) is an alternating-current signal obtained from the FG coil 21 when the FG coil 21 and the FG magnet 22 are relatively rotated (moved) with the rotation of the motor 20.

Figure 5:
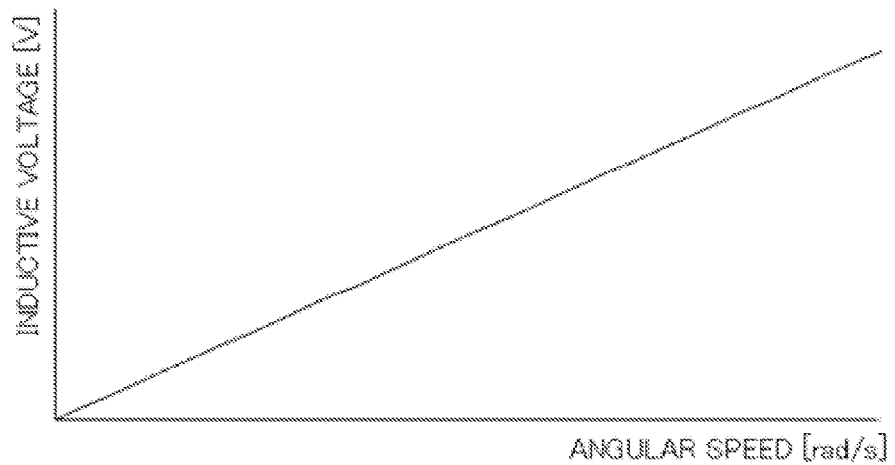
FIG. 5 is a relationship between inductive voltage and angular speed.

Relative angular speed of such FG coil and magnet and inductive voltage to be generated in the FG coil generally have a proportional relationship as shown in FIG. 5. Therefore, amplitude of the alternating-current signal is changed in proportion to the rotational speed of the motor.

Figure 7:
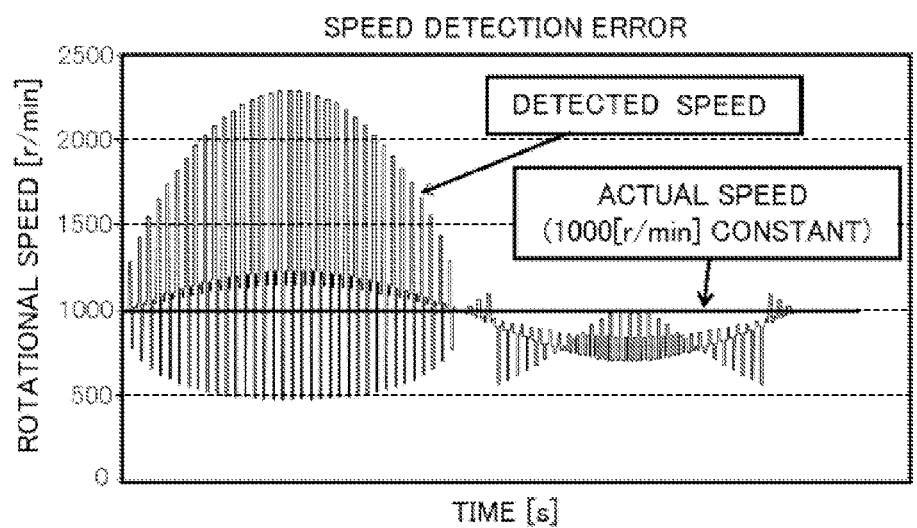
FIG. 7 shows an error in speed detection.

If this alternating-current signal is input to the divider 3 shown in FIG. 1 without change, the number of pulses of the speed detection signal output per one rotation of the motor is varied or an error included in motor rotation speed shown by the speed detection signal is increased, which provides a wave from of the speed detection signal shown in FIG. 7. It is difficult to use such a speed detection signal for control of the motor 20.

Figure 6:
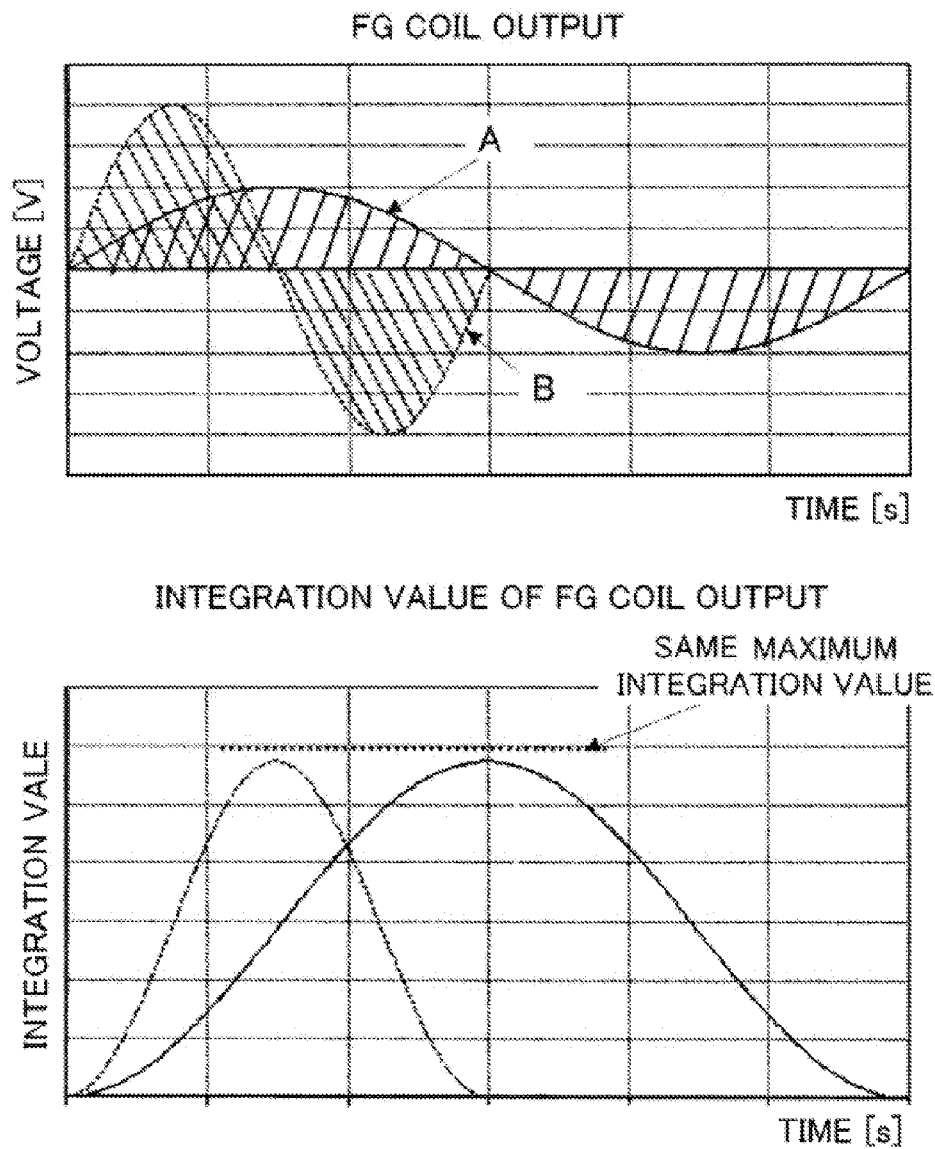
FIG. 6 shows a relationship between output voltage of an FG coil included in the motor speed detection apparatus of the embodiment and integration value obtained by the integration value calculator.

However, in the FG coil output shown by an upper graph in FIG. 6, an area of a part shown by A and an area of a part shown by B are equivalent to each other according to the proportional relationship shown in FIG. 5. That is, even if the amplitude of the FG coil output (alternating-current signal) is changed with change of the rotation speed, the integration value of the FG coil output does not change as shown in a lower graph in FIG. 6. This embodiment performs, in order to acquire a stable speed detection signal by utilizing such a characteristic, the time integration on the FG coil output. The peak holder 6 shown in FIG. 2 is provided for detecting amplitude of the integration value of the FG coil output.

As described above, this embodiment divides one cycle signal of the alternating-current signal from the FG coil 21 to raise the sampling frequency. Therefore, this embodiment enables arbitrary setting of the sampling frequency without being subjected to any physical restriction, which makes it possible to accurately detect the rotational speed of the motor 20. Controlling the motor 20 using such accurately detected rotational speed enables stable speed control of the motor 20.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2011-160670, filed on Jul. 22, 2011 which is hereby incorporated by reference herein in their entirety.

What is claimed is:

1. A motor speed detection apparatus configured to detect rotational speed of a motor, the apparatus comprising:
   a frequency generation coil and a magnet that are configured to be relatively moved with rotation of the motor, the frequency generation coil outputting an alternating-current signal to be sampled by the apparatus;
   an A/D converter configured to convert the alternating-current signal output from the frequency generation coil into a digital signal;
   an integrator configured to perform time integration on the digital signal output from the A/D convertor;
   a first determiner configured to determine which one of plural threshold ranges includes an integration value obtained by the integrator;
   a second determiner configured to determine whether change of the integration value is increase or decrease; and
   a logical product calculator configured to produce a binary signal showing a logical product of determination results of the first and second determiners,
   wherein the apparatus is configured to calculate the rotational speed based on a production cycle of the binary signal.

2. A motor speed detection apparatus according to claim 1, wherein the integrator is configured to perform peak hold of the integration value at each cycle of the alternating-current signal output from the frequency generation coil.

3. A motor control apparatus comprising:
   a motor speed detection apparatus configured to detect rotational speed of a motor; and
   a controller configured to control the motor based on the rotational speed detected by the motor speed detection apparatus,
      wherein the motor speed detection apparatus comprising:
   a frequency generation coil and a magnet that are configured to be relatively moved with rotation of a motor, the frequency generation coil outputting an alternating-current signal to be sampled by the apparatus;
   an A/D converter configured to convert the alternating-current signal output from the frequency generation coil into a digital signal;
   an integrator configured to perform time integration on the digital signal output from the A/D convertor;
   a first determiner configured to determine which one of plural threshold ranges includes an integration value obtained by the integrator;
   a second determiner configured to determine whether change of the integration value is increase or decrease; and
   a logical product calculator configured to produce a binary signal showing a logical product of determination results of the first and second determiners,
   wherein the motor speed detection apparatus is configured to calculate the rotational speed based on a production cycle of the binary signal.

* * * * *